Aug. 19, 1924.
F. K. BRAINARD
1,505,853
ELECTRICAL GOVERNING APPARATUS
Filed Oct. 9, 1920
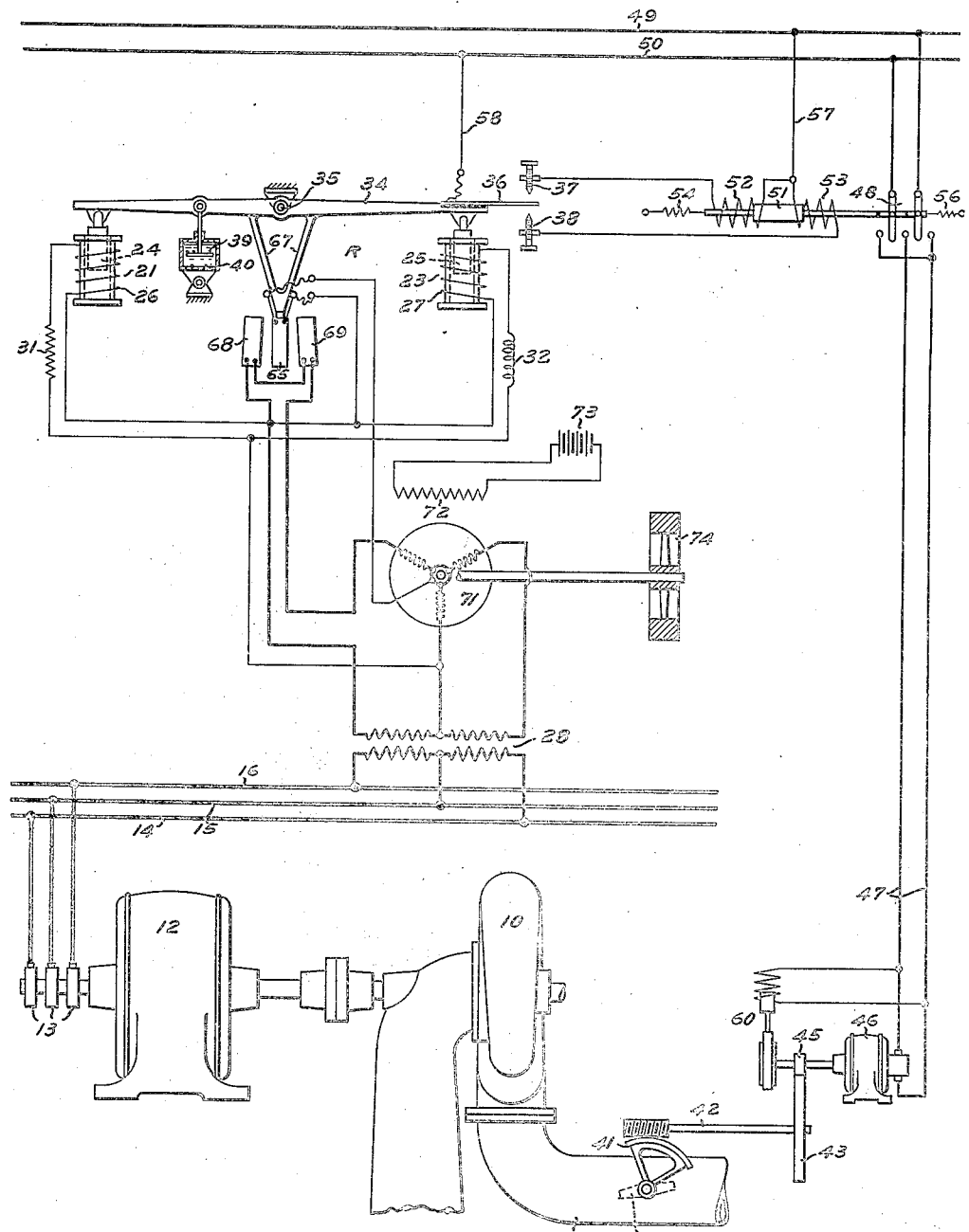
Inventor
F. K. Brainard
by
Attorney Patented Aug. 19, 1924.

1,505,853

UNITED STATES PATENT OFFICE.

FRANK K. BRAINARD, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

ELECTRICAL GOVERNING APPARATUS.

Application filed October 9, 1920. Serial No. 415,931.

*To all whom it may concern:*

Be it known that FRANK K. BRAINARD, a citizen of the United States of America, residing at West Allis, in the county of Milwaukee and State of Wisconsin, has invented a certain new and useful Improvement in Electrical Governing Apparatus, of which the following is a specification.

This invention relates in general to regulating or governing apparatus, and it has particular relation to apparatus for controlling or regulating prime movers driving electrical apparatus.

Regulating or governing apparatus making use of variations in frequency of alternating current has been in existence for some time, the broad principle of operation being that, as the speed of the generator varies, due to variation in electrical load or otherwise, there is a corresponding variation in frequency of the alternating current generated, this latter variation being utilized to actuate control mechanism of any desired character for regulating the generator or the supply of motive fluid to the prime mover driving the generator.

Where the control is exercised through variations in frequency which are responsive to variations in the load on a generator, or it is desired to maintain the speed of the generator substantially constant in spite of variations in load or pressure at the inlet of the prime mover, there is ordinarily a time element involved in the control, for the change in speed occurs subsequent to a change in the load or inlet pressure. The general features of the invention include the provision of means effective to reduce to a minimum the time interval between the occurrence of a load variation and the consequent speed controlling action exercised through a regulator; in other words to provide electrically-actuated controlling means which has an action analogous to that of a mechanical inertia governor.

It is an object of this invention to provide an improved type of regulating device embodying electrical apparatus responsive to variations in a characteristic of electrical energy.

It is a further object of this invention to provide an improved type of regulator for prime movers embodying electrical apparatus responsive to the frequency of alternating current supplied by a generator driven through the prime mover.

These and other objects and advantages are attained by this invention, various novel features of which will appear from the description and drawing, disclosing one embodiment of such invention, and will be more particularly pointed out in the claims.

The drawing is a diagrammatic illustration of apparatus embodying features of this invention, the same being applied to the control of a hydraulic turbine driving an alternating current generator.

As shown in the drawing, the inlet 9 of a hydraulic turbine 10 is controlled by suitable means, indicated here by a conventional showing of a valve 11 mounted to control the passage of fluid through the inlet 9. An alternating current generator 12 is mechanically connected to the hydraulic turbine 10 to be driven thereby, the slip rings 13 of the generator being shown connected to a supply line 14, 15, 16.

An improved regulator for controlling the operation of the turbine 10, primarily for the purpose of securing operation thereof at substantially constant speed independently of variations in load on the generator or pressure of fluid at the turbine inlet, includes a frequency-responsive relay, indicated generally by R. This relay includes two opposed electromagnets 21 and 23, preferably of the plunger type, the plungers being designated 24 and 25, respectively, and the windings therefor being designated 26 and 27, respectively. These windings are supplied with energy in parallel from one phase of the polyphase transformer 28, this transformer being connected to the supply line 14, 15, 16. The winding 26 has included in series in its circuit a non-inductive resistance 31 and the winding 27 has in series in its circuit an inductance 32, the general purpose of the resistance 31 and inductance 32 being to vary the current in the two windings 24 and 25 in response to variations in the frequency of the current with which these windings are supplied.

A member 34 is suitably attached to the plungers 24 and 25 of the electromagnets 21 and 23, respectively, and is pivoted at a point intermediate the points of attachment of the plungers, as indicated at 35. This member 34 is preferably of non-magnetic material, and one end of the member is provided with a contact 36 which, under normal conditions of operation of the system, floats between fixed contacts 37 and 38 without making electrical connection with either thereof. These contacts 37 and 38 may be of any suitable type, but preferably are such as to permit any desired adjustment, being here shown in the form of threaded members adjustable in fixed supports.

The ampere-turns of windings 26 and 27 and the resistance 31 and inductance 32 are so selected that under conditions of operation of the generator 12 at its normal and desired speed, there is a balanced pull on the member 34 through the plungers 24 and 25, the effect being to maintain the member 34 and its attached contact 36 in intermediate position with the latter contact out of engagement with both of the relatively fixed contacts 37 and 38.

If desired, one or more damping devices may be used for retarding the motion of the member 34 to eliminate inconsequential vibrations. This damping device may be in the form of a piston 39 attached to the member 34 and relatively freely movable in fluid contained in a stationary cylinder 40.

The valve 11, or other movable regulator at the inlet of the prime mover 10 is actuable by a suitable mechanical connection, designated as 41, and here shown in the form of a sectional gear operated by a worm on a shaft 42 which is connected through reduction gearing 43, 45 to the shaft of an electric motor 46. This motor may be of any suitable type, being here shown as having its armature circuit 47 connected, through a reversing switch 48, to a supply line 49, 50 which may be direct current or single-phase alternating current. The switch 48 is biased to open-circuit position and is operable to either of its closed positions by an electromagnetic device comprising a core 51 and windings 52 and 53 effective, when energized, to draw the core in opposite directions to thereby shift the switch 48 to either of its closed positions. Springs 54 and 56 are shown for biasing both the switch 48 and core 51 to neutral position. One terminal of each of the windings 52, 53 connected through the connector 57 to one side of the supply line 49, 50. The other terminal of each of the windings 52, 53 is connected to one or the other of the fixed contacts 37, 38, the circuit through these contacts and the windings being completed through the switch contact 36 and the connector 58 to the other side of the supply line 49, 50. The connector 58 may be connected directly to the contact 36, as shown, or through the member 34, in such case being preferably attached thereto at its pivotal point.

With the constructive arrangement described, it will be apparent that on the completion of the circuit of either of the electromagnet windings 52 and 53, the plunger or core 51 actuates the switch 48 to one or the other of its closed positions, thereby causing completion of the circuit of the motor 46 and consequent closing or opening operation of the inlet valve 11, power being supplied from the motor 46 through the gearing connection 45, 43, shaft 42 and operating mechanism 41. This closing or opening of the inlet valve or controller 11 of the prime mover 10 insures the supply thereto of the required amount of mechanical energy to maintain the required speed and frequency of the generator 12.

With the apparatus shown, it will be apparent that, on decrease in speed of the prime mover 10 and the generator 12, the electromagnet 23 becomes effective to overpower the electromagnet 21, because of the decrease in frequency of the current supplied to the latter, and complete the circuit of the winding 53, thus causing closure of the switch 48 and operation of the motor 46 in a direction to cause opening of the inlet valve 11, with the consequent return to normal of the generator 12, on the occurrence of which the electromagnets 21 and 23 again balance each other and hold the contact 36 out of engagement with the fixed contacts 37 and 38. On the other hand, on increase in speed above normal, the increased frequency is effective to cut down the current in the winding 27 and permit the electromagnet 21 to overpower the electromagnet 23, thus causing completion of the circuit of the energizing winding of the magnet 52. This causes closure of the switch 48 and operation of the motor 46 in a direction to cause closure of the controlling element 11, thus reducing the speed of the prime mover 10 and generator 12 to normal value. At this time, the electromagnets 21 and 23 again balance each other and the contact 36 is held out of engagement with the contacts 37 and 38.

An electromagnetic brake 60 is provided for the shaft of the motor 46 to cause operation of the latter to be discontinued upon opening of the motor circuit. The brake is biased to braking position and is released by the electromagnet when the motor circuit is completed through the switch 48.

It will be apparent that with only those features of construction described above, a regulator is provided which is responsive to variations in speed of the prime mover, acting through the variations in the frequency of the generator current, and this regulation is effective to produce desirable control of the prime mover and its generator.

However, in order to gain rapidity and refinement in the actuation of the relay R for speed control purposes, an additional torque-producing element is provided for actuating the movable switch contact 36. The arm 34 has attached thereto a fine wire or potential coil 65, this coil being maintained in fixed relation to the member 34, as by being mounted upon the frame element 67. This potential coil 65 is normally disposed intermediate the coarse wire or series coils 68 and 69, the latter being held stationary relatively to the movable coil 65. The coils 68 and 69 are connected in series with each other and in series with one phase of a small synchronous motor 71 supplied through the transformer 28. The potential coil 65 is connected across one phase of the circuit supplying the synchronous motor. The direct current field of the synchronous motor is indicated at 72, the same being supplied from a constant potential source 73, as shown, or from the direct current supply line 47. This synchronous motor is comparatively small but has mounted on its shaft a fly wheel 74 of considerable inertia, the general purpose and effect being to maintain the speed of the motor substantially constant in spite of variations in characteristics of the current supplied thereto. At least, fluctuations in speed of the motor will be inconsiderable compared to fluctuations in the current supplied to the motor, this effect being secured through the fly-wheel 74, which has the function of tending to maintain the speed constant, supplying energy to the motor on any slight decrease in frequency of current, and acting as a load on the motor to be speeded up thereby on any increase in frequency of the current in the motor circuit. It will be apparent that, on decrease in speed of the prime mover 10 and generator 12 and consequent decrease in frequency of the current supplied by the latter, the current in the circuit of the motor 71 decreases, due to the fact that the fly-wheel 74 gives up some of its energy to the motor and the electrical power required by the latter is decreased, and this decrease in current, acting through the coils 68, 69, destroys the normal balance between the watt-meter elements consisting of the series coils 68, 69 and the potential coil 65, the effect being to cause or assist actuation of the movable element 34 and the contact 36 into engagement with contact 38, the result of which is closing of the switch 48 and the operation of the motor 46 in a direction to cause opening of the controlling valve or throttle 11. The increased supply of energy to the prime mover brings the speed and frequency back to normal.

On the other hand, in case of an increase in speed of the prime mover 10 and generator 12, such as might occur upon the removal of electrical load therefrom, and the consequent increase of the current in the supply line, the motor 71 tends to speed up, being opposed by the fly-wheel 74 acting as a load on the motor, the general result being that the motor 71 takes more current. This latter effect is reflected in the series coils 68, 69 of the watt-meter element, this increase in current in these coils causing a destruction of the balance between these latter coils and the coil 65, and resulting in operation of the contact 36 to complete the circuit of the winding 52, and consequent closure of the switch 48 and operation of the motor 46 in a direction to cause closing of the inlet valve or throttle 11. The decreased supply of energy brings the speed and frequency back to normal.

The distinctive feature of operation of the watt-meter element of the relay consisting of the potential coil 65 and the current coils 68, 69 supplied through the circuit of the synchronous motor 71, is that there is no appreciable element of time involved in its effective operation. It may be said that effective operation of the relay through the coils 65, 68, 69 may occur at the commencement of a change in generator speed and frequency, for a very small variation in speed or frequency can cause sufficient variation in the current supplied to the watt-meter device to cause the desired operation of the contact 36. It may be considered that the regulator with the fly-wheel synchronous motor has an action analogous to that of a mechanical inertia governor rather than an ordinary speed governor, the regulator functioning upon a tendency to appreciable change in frequency rather than awaiting the actual occurrence of appreciable change, such as might otherwise be occasioned by variation in load upon the generator. Accordingly, it may be proper to refer to the regulator as an electrically-operated inertia governor.

In line with this consideration, in the case of the particular type of motor disclosed herein, it may be considered that the controlling effect is due to the change in displacement of the field of the motor relatively to the pole centers of the armature.

It will be apparent that the amount of power available for operation of the watt-meter device is inherently dependent upon the rate of change in the frequency of the energy supplied to the motor; and this rate of change in the frequency is an element whose presence is felt almost immediately upon the occasion of any change in the frequency. Obviously, this insures a minimum time element in the operation of devices for controlling turbine gates or other controlling devices for returning the speed, or characteristic of the energy supplied by the generator, to normal.

It will be noted that the torque exerted by the watt-meter element, including the coils 65, 68, 69, and the fly-wheel synchronous motor, is in response to any tendency toward a change in frequency irrespectively of any definite or normal value of the frequency; while the torque exerted by the electromagnets 21 and 23 is responsive to the attainment of some definite value of frequency above or below the normal value.

It will be apparent that the improved regulating device described herein is capable of securing not only the control exercised through the ordinary frequency-responsive regulator, but also an improved and refined control exercised through the watt-meter element, this latter control being more rapid and more nearly in synchronism with the actual load or other change on the generator.

In its broader aspects, the invention is not necessarily limited to frequency responsive or frequency controlling devices. The flywheel motor may be one which has a tendency to change its speed in response to the voltage impressed thereon, generally for the purpose of checking substantial variation in the voltage or other characteristic of the generator. Likewise, while a synchronous motor is specifically described as the means for controlling the watt-meter device, it will be apparent that this motor may be of the induction or other type wherein a characteristic of the energy or current supplied to the motor is variable, through the effect of the fly-wheel.

It will be apparent that a single controlling apparatus of the character described herein may be utilized to control simultaneously a plurality of prime movers driving several generators connected in parallel to the same supply circuit.

The prime mover or the inlet controlling means therefor may be of any ordinary and well known character such as adjustment of the guide vanes or inlet nozzle of a hydraulic turbine, or adjustment of the throttle of a steam engine or turbine.

It should be understood that the invention claimed is not limited to the exact details of construction shown and described herein, for obvious modifications will occur to one skilled in the art.

It is claimed and desired to secure by Letters Patent:

1. A governing apparatus comprising an electric motor tending to maintain its speed substantially constant in spite of variations in a characteristic of the current supplied to the motor, a device responsive to variations from normal in the electrical power supplied to said motor, and a controlling element actuatable by said device.

2. A governing apparatus comprising an alternating current motor whose speed tends to respond to the frequency of the current supplied thereto and having means tending to maintain the speed of the motor substantially constant in spite of variations in the frequency of the current supplied to the motor, and a controlling element responsive to variations from normal in a characteristic of the electrical energy supplied to said motor.

3. A governing apparatus comprising an alternating current motor whose speed tends to respond to the frequency of the current supplied thereto and having a rotating element of considerable inertia tending to maintain the speed of the motor substantially constant in spite of variations in frequency of the current supplied to the motor, a device responsive to variations from normal in the electrical power supplied to said motor, and a controlling element actuatable by said device.

4. A governing apparatus comprising a synchronous motor having means tending to maintain its speed substantially constant in spite of variations in frequency of the current supplied to the motor, a device responsive to variations from normal in a characteristic of the electrical power supplied to said motor, and a controlling element actuatable by said device.

5. A governing apparatus comprising an alternating current motor whose speed tends to vary in response to the frequency of the current supplied to the motor and having a rotating element of considerable inertia tending to maintain the speed of the motor substantially constant in spite of variations in frequency of the current supplied to the motor, a torque-producing device responsive to variations from normal in a characteristic of the power supplied to said motor, an electromagnetic device responsive to variations in the frequency of the current supplied to said motor, and a controlling element actuatable in response to effects produced thereon by either said torque-producing device or said electromagnetic device.

6. A governing apparatus comprising a synchronous motor having a rotating element of considerable inertia tending to maintain the speed of the motor substantially constant in spite of variations in frequency of the current supplied to the motor, a watt-meter device responsive to variations from normal in the electrical power supplied to said motor, an electromagnetic device inoperative under conditions of normal frequency and responsive to abnormal frequency of current in the circuit supplying said motor, and a controlling element actuatable in response to effects produced thereon by either said frequency-responsive device or said watt-meter device.

7. A governing apparatus comprising an alternating current motor whose speed tends to respond to the frequency of the current supplied thereto and having a rotating element of considerable inertia tending to maintain the speed of the motor substantially constant in spite of variations in frequency of the current supplied to the motor, a watt-meter device having a potential coil and a series coil carrying current proportional to the current in the circuit of said motor, an electromagnetic device operative in response to conditions of abnormal frequency of the current supplied to said motor, a controlling element actuatable in response to effects produced thereon by either said frequency-responsive device or said watt-meter device.

8. A governing apparatus comprising a synchronous motor having a rotating element of considerable inertia tending to maintain the speed of the motor substantially constant in spite of variations in frequency of the current supplied to the motor, a watt-meter device having a potential coil and a series coil carrying current proportional to the current in the circuit of said motor, an electromagnetic device responsive to conditions of abnormal frequency of current in the circuit supplying said motor, and a double-acting contact device actuatable by either said frequency-responsive device or said watt-meter device.

9. In combination with a prime mover, a generator driven thereby, means for controlling the supply of energy to said prime mover, a motor supplied with energy from said generator and tending to maintain its speed substantially constant in spite of variations in a characteristic of the electrical power supplied thereto, a device responsive to variations from normal in the electrical power supplied to said motor, and a controlling element actuatable by said device and operative to adjust said energy controlling means for said prime mover.

10. In combination with a prime mover, a generator mechanically connected in driven relation thereto, means for controlling the supply of energy to said prime mover, a synchronous motor supplied with energy from said generator and having a rotating element of considerable inertia tending to maintain the speed of the motor substantially constant in spite of variations in frequency of the current supplied to the motor, a device responsive to variations from normal in the electrical power supplied to said motor, and a controlling element actuated by said device and operative to adjust said energy-controlling means for said prime mover.

11. In combination with a prime mover, a generator mechanically connected in driven relation to said prime mover, means for controlling the supply of energy to said prime mover, an alternating current motor supplied with energy from said generator and whose speed tends to respond to a characteristic of the power supplied thereto and having a rotating element of considerable inertia tending to maintain the speed of the motor substantially constant in spite of variations in a characteristic of the electrical energy supplied thereto, a watt-meter device having a potential coil and a series coil carrying current proportional to the current in the circuit of said motor, an electromagnetic device responsive to abnormal frequency of the current supplied to said motor, a controlling element actuatable in response to effects produced thereon by either said frequency-responsive device or said watt-meter device and operative to adjust said energy-controlling means for said prime mover.

12. In combination with a prime mover, a generator mechanically connected in driven relation thereto, a synchronous motor supplied with energy from said generator and having a rotating element of considerable inertia tending to maintain the speed of the motor substantially constant in spite of variations in frequency of the current supplied to the motor, a watt-meter device having a potential coil and a series coil carrying current proportional to the current in the circuit of said motor, an electromagnetic device inoperative under conditions of normal frequency and responsive to abnormal frequency of current in the circuit supplying said motor, a double-acting contact device actuatable in response to effects produced thereon by either said frequency-responsive device or said watt-meter device and operative to adjust said energy-controlling means for said prime mover.

13. A governing apparatus comprising a power responsive device, a frequency responsive device for controlling the power supplied to said power responsive device, and a controlling element actuatable through said power responsive device.

14. A governing apparatus comprising a power responsive device, a device responsive to the rate of change of frequency for controlling said power responsive device, and a controlling element actuatable through said power responsive device.

15. A governing apparatus comprising a device operatively responsive to both increase and decrease of a characteristic of the energy in an electrical circuit and further responsive to the rate of such increase and decrease, and a controlling element actuatable through operation of said device.

16. A governing apparatus comprising a device responsive to the rate of both increase and decrease in a characteristic of the energy in an electrical circuit, and a controlling element actuatable through said device.

17. A governing apparatus comprising a device responsive to a variation from normal of the frequency of the current in an electrical circuit, a device responsive to the rate of change of said frequency, and a controlling element actuatable by said two devices.

18. A governing apparatus comprising a device responsive to variations from a normal value in a characteristic of the current in an electrical circuit, a device responsive to the rate of change of said characteristic, and a controlling element actuatable by said two devices.

19. A governing apparatus comprising an alternating current motor having a rotatable element of considerable inertia and adapted to resist changes in the operating speed thereof in spite of variation in a characteristic of the current supplied to said motor, a device responsive to the electrical power supplied to said motor, a device responsive to said characteristic of the current, and a controlling element actuatable by said two devices.

20. An electrically operated governing apparatus comprising a device responsive to the rate of change of the frequency of an electrical circuit to a degree directly proportional to such rate of change, and a controlling element actuatable through said device.

21. In combination with an electrical circuit and an electrical generator for supplying said circuit, apparatus for controlling said circuit, comprising a device responsive to a variation from normal of a characteristic of the energy of said circuit, means directly responsive to the rate of change of a characteristic of said energy for altering the operating effect of said device, and a controlling element actuatable by said device.

22. A governing apparatus for controlling an alternating current electrical circuit, comprising a controlling circuit, an electromagnetically actuated device operatively responsive to the frequency of said electrical circuit, and electromagnetically actuated means responsive to the current in said controlling circuit for causing the responsiveness of said device to vary directly as the rate of change of the frequency in said electrical circuit.

23. A governing apparatus comprising an alternating current motor the speed of whose rotating element tends to respond to the frequency of the current supplied thereto, and having means tending to maintain the speed of said rotating element substantially constant in spite of variations from normal value in the frequency of the current supplied to the motor, and a controlling element responsive, through effects due to said motor, to variations from normal in the frequency of the electrical energy supplied to said motor.

24. A governing apparatus comprising a synchronous motor having means tending to maintain the speed of a rotatable element thereof substantially constant in spite of variations from normal value in the frequency of the current supplied to the motor, and a controlling device responsive, through effects due to said motor, to said variations in the frequency.

25. In combination with a prime mover, a generator driven thereby, means for controlling the supply of energy to said prime mover, an alternating current motor supplied with energy from said generator and tending to maintain the speed of a rotatable element thereof substantially constant in spite of variations in a characteristic of the electrical power supplied thereto, and means operative to adjust said energy controlling means for said prime mover, said adjusting means being responsive to effects produced through said motor on variation from normal value of the speed of said prime mover.

In testimony whereof, the signature of the inventor is affixed hereto.

FRANK K. BRAINARD.